Figure 1:
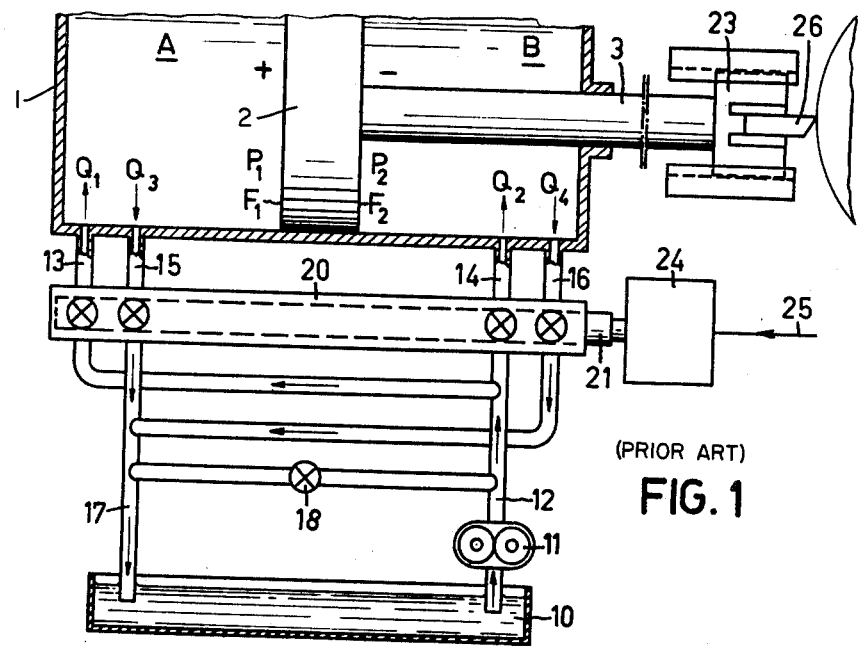

Aug. 17, 1965   T. J. VIERSMA ETAL   3,200,713
HYDRAULIC SERVO-MECHANISM
Filed March 26, 1962   3 Sheets-Sheet 1

INVENTOR
TACO J. VIERSMA
HELMUT GÜNTHER
BY Frank R...
AGENT

Aug. 17, 1965  T. J. VIERSMA ETAL  3,200,713
HYDRAULIC SERVO-MECHANISM
Filed March 26, 1962  3 Sheets-Sheet 3

INVENTOR
TACO J. VIERSMA
HELMUT GÜNTHER
BY
AGENT

United States Patent Office

3,200,713
Patented Aug. 17, 1965

3,200,713
HYDRAULIC SERVO-MECHANISM
Taco Jan Viersma, Eindhoven, Netherlands, and Helmut Gunther, Hamburg, Germany, assignors to North American Philips Company, Inc., New York, N.Y., a corporation of Delaware
Filed Mar. 26, 1962, Ser. No. 182,289
Claims priority, application Netherlands, Apr. 4, 1961, 263,175
14 Claims. (Cl. 91—49)

The present invention relates to a hydraulic servo-mechanism comprising one or more working cylinders, in each of which a piston is adapted to move, at least one of the cylinder compartments determined by the piston surface having an inlet and an outlet for the hydraulic fluid, while the size of at least one of the openings of flow in the inlet or the outlet is controllable by means of an external control-member. Such servo-mechanisms are known and may be employed, for example, for driving machine tools. The operation of such a servo-mechanism may be linear or rotary, reference is made in this connection to pages 204 and 208 of "Servo-mechanisms and Regulating System Design" of H. Chestnut and W. Mayer (1959) McGraw-Hill.

In the known servo-mechanisms the inlet and the outlet with the said openings of flow may communicate directly with the cylinder compartment concerned or via an auxiliary space communicating with the said compartment. The size of one or more of the flow apertures is regulated by means of an externally controlled slide. A variation in the position of the control-slide will vary the size of one or more of the flow apertures and hence the difference between the quantities of fluid passing through the inlet and the outlet of the compartment. Thus the piston is capable of moving with respect to the surrounding cylinder. The external control-signal of the control-slide used thus determines the position of the piston relative to the cylinder and hence also the position of the associated parts, for example the sledge of a machine tool.

If it is supposed for the sake of simplicity that the piston is movable in a stationary cylinder, the total axial piston load may be considered to be composed of various components, for example the inertia forces due to the accelerations and decelerations of the masses of the piston and of the parts connected herewith, the external load, for example produced by the forces required for the milling operation of the sledge of the machine tool connected with the piston and the frictional forces produced by the movement of the piston relatively to the cylinder. It is known that a hydraulic servo-mechanism operates as an integrator, which means that apart from certain starting phenomena and inertia forces involved there is a given characteristic, linear relationship between the speed of the piston and the value of the control-signal or the speed of the control-slide. However, this characteristic relationship between the speed of the piston and the value of the control-signal is disturbed by the total piston load. The reversal of the piston movement, for example, will give rise to a reversal of the dry or Coulomb friction. This dry friction results in a so-called dead travel, i.e., the control-slide is capable of reciprocating without the piston being moved, since the latter is withheld by the friction. The disturbing effect of the piston load may be accounted for by the variation in pressure in one or in both cylinder compartments due to the load, so that the difference between the quantities of fluid flowing per unit time through the inlet and outlet of at least one compartment is varied irrespective of the external control-signal and hence of the position of the control-slide. As a result the piston will be displaced with respect to the cylinder. For regulation techniques such a displacement of the piston not initiated by a variation of the external control-signal is undesirable.

The present invention has for its object to mitigate the disadvantages described above.

The servo-mechanism according to the invention, which may be of the linear as well as of the rotary type, is characterized in that provision is made of a member responding to the pressure in at least one compartment, which varies the size of one or more flow apertures with a variation in pressure so that the difference between the quantities of fluid passing per unit time through the inlet and the outlet of the compartment is substantially independent of the pressure prevailing in this compartment. It has been found that by introducing a member responding to the pressure in at least one of the cylinder compartments the pressure variation in the compartment concerned may be caused to produce a variation in the size of one or more flow apertures, quite independently of the external control-signal. By means of the said pressure-responding member the size of one or more flow apertures may be changed so that, irrespective of the external control-signal as stated above the size of the flow apertures always depends upon the pressure difference in front of and after the flow aperture. It has been found that these measures can provide a satisfactory load compensation, which means that the disturbing effect of the load is obviated for the major part.

In one embodiment of the invention one or more flow apertures is (are) modified independently of the external control-signal so that with an increase in pressure in at least one of the cylinder compartments the size of the flow aperture of the supply to that compartment is reduced and/or the size of the flow aperture in the outlet of this compartment is increased by means of the member responding to pressure.

In a further embodiment of the invention the pressure-responding member comprises an elastically deformable element, for example a diaphragm, the elastic deformation of which can control the size of one or more flow apertures. If, for example, the external control referred to above is brought about by a control-slide, the coupling between the elastically deformable element and the control-slide may, of course, be established in various ways. It is, for example, possible, to connect the said element directly with the control-slide. It will be obvious that this coupling involves severe requirements for the sensitivity of the pressure-responding member. It has been found that by means of an elastically deformable element such as a diaphragm these requirements can be fulfilled to a high extent. However, if owing to excessively severe structural requirements the coupling between the elastically deformable element and the control-slide cannot be a direct connection, a converter may be arranged between this element and the control-slide for converting the elastic deformation of the pressure-responding element into a given electrical magnitude, which is capable of performing a variation in the position of the control-slide.

The invention furthermore provides a few important main embodiments of the servo-mechanism of the kind set forth. In each of these embodiments it is essential that with a pressure variation in the cylinder compartment the difference between the supplied and drained quantities of fluid per unit time with the compartment concerned should be kept substantially independent of the pressure prevailing in the said compartment. Each of these embodiments comprises a member responding to the pressure in at least one compartment.

The first main embodiment of the hydraulic servo-mechanism according to the invention, comprising an externally controlled slide for the simultaneous regulation of the size of each flow aperture in at least one cylinder compartment, is characterized in that the control-slide is coupled with the member responding to the pressure(s) in one or both compartments so that with an increase in pressure in one compartment the size of the flow aperture in the inlet of this compartment is reduced and at the same time the size of the flow aperture of the outlet of this compartment is enlarged. The simultaneous control of all flow apertures of at least one compartment by means of the fluid pressure is preferably adjusted so that complete load compensation is achieved under the conditions under which a servo-motor of the linear type is in a static state of equilibrium, in which the external load of the piston, the piston speed and the size of the external control-signal have all the zero value. Beyond the said state of static equilibrium a certain degree of compensation will, of course, also be obtained, though it will not be complete. In this main embodiment the load compensation is obtained by rendering the size of each flow aperture dependent upon the pressure difference on either side of this flow aperture to an extent such that the quantity of hydraulic fluid passing through the flow aperture is independent of the pressure difference between the pressures on either side of this flow aperture. It will otherwise be obvious that this main embodiment is also suitable for use with hydraulic servo-mechanisms of the rotary type.

With a second main embodiment the hydraulic servo-mechanism according to the invention comprises an externally controlled slide for regulating the size of a number, but not of all of the flow apertures of at least one compartment. This embodiment is characterized in that the further flow aperture(s) is (are) controllable by means of a pressure-responding member. With this embodiment at least one of the apertures of one cylinder compartment is regulated by external control, for example a control-slide and the other aperture by means of a compensating, pressure-responding member. The last-mentioned member may also be a slide, comprising an elastically deformable member, the elastic deformation of which determines the position of the second slide. With this embodiment, in which the pressure-responding member governs the flow aperture either in the inlet or in the outlet, the size of the flow aperture to be governed by the pressure-responding member is rendered dependent upon the difference between the pressures on either side of the said aperture to an extent such that with a pressure variation in the cylinder compartment concerned the greater (or smaller) quantity of fluid flowing per unit time through one of the apertures is equal to that flowing through the other aperture. With this embodiment in which also with a pressure variation in at least one compartment the difference between the supplied and drained quantities of fluid in this compartment is substantially independent of the pressure prevailing in the said compartment, a satisfactory load compensation is obtained also in those regions of the load on the piston, in which the piston is not in the state of static equilibrium.

With a further structure of this second main embodiment one of the cylinder compartments comprises at least one outlet aperture, whilst the piston itself has a number of ducts through which the cylinder compartments communicate with each other, whilst the other cylinder compartment is connected with a substantially constant fluid pressure. The size of the outlet aperture or of the ducts referred to can be controlled. The servo-mechanism, which is of the so-called linear type in this case, is characterized in that the piston part facing the first-mentioned compartment is provided with a diaphragm, the periphery of which is secured to the piston and which has a central opening. Between the elastically deformable diaphragm and a fixed part of the piston is now formed a passage, the size of which may be varied so that with an increase in pressure in the first-mentioned compartment the passage is enlarged and the difference between the fluid quantities supplied and conducted away per unit time remains substantially constant.

The foregoing will now be described more fully with reference to the drawing, which shows a few embodiments of a servo-mechanism of the linear type.

FIG. 1 shows diagrammatically a known type of hydraulic servo-mechanism used in the control of a machine tool.

Figure 2:
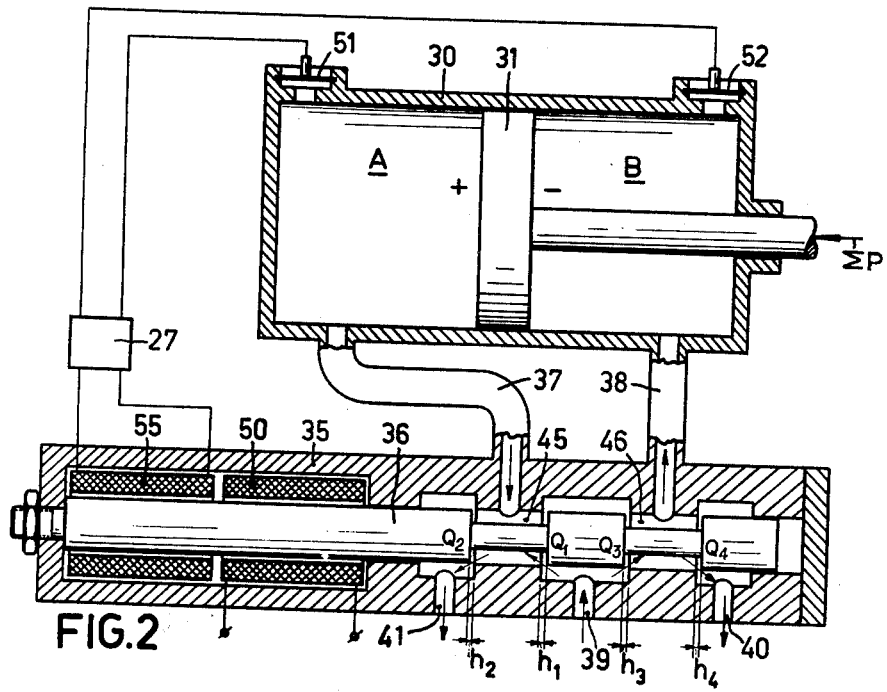
Figure 3:
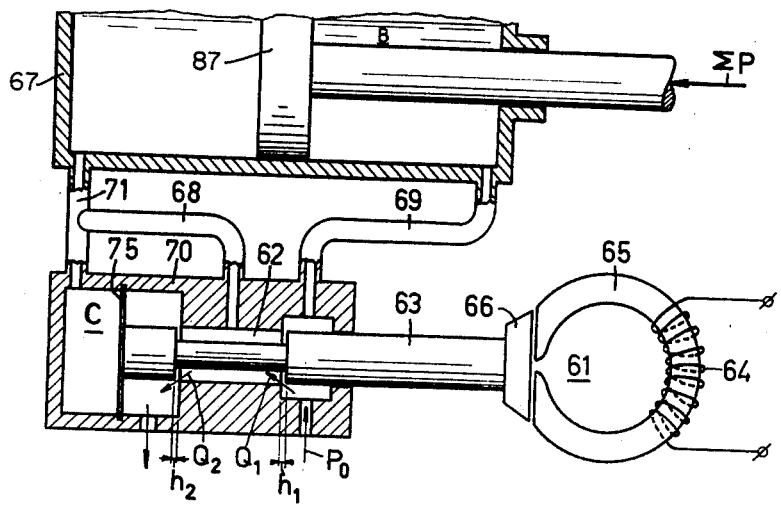

FIGS. 2 and 3 refer to the first main embodiment of the servo-mechanism according to the invention, in which all flow apertures of at least one cylinder compartment are controlled simultaneously by the elastic deformation of a pressure-responding member. FIG. 2 shows a servo-mechanism with four-side control and FIG. 3 shows a mechanism with two-side control.

Figure 4:
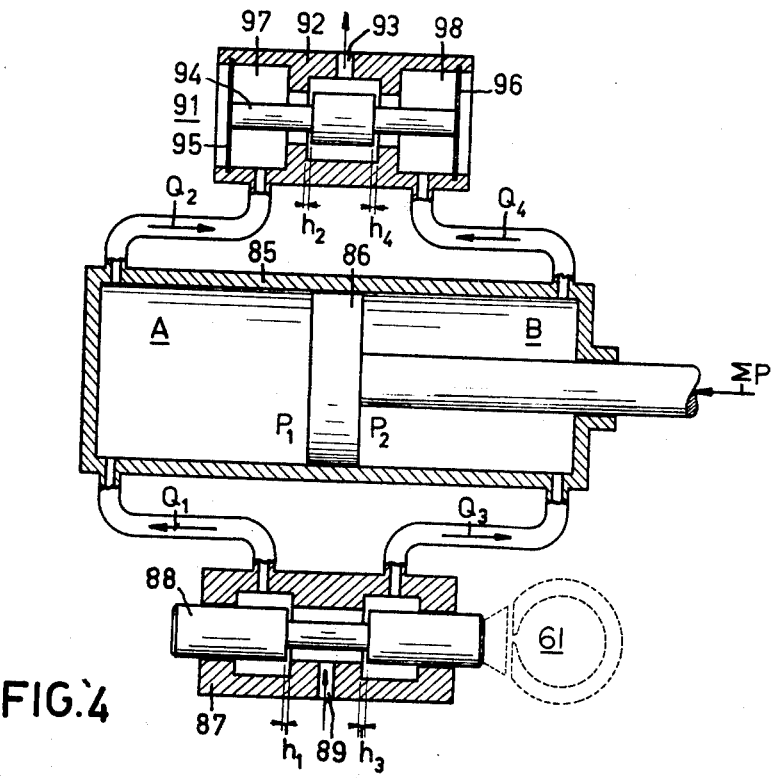
Figure 5:
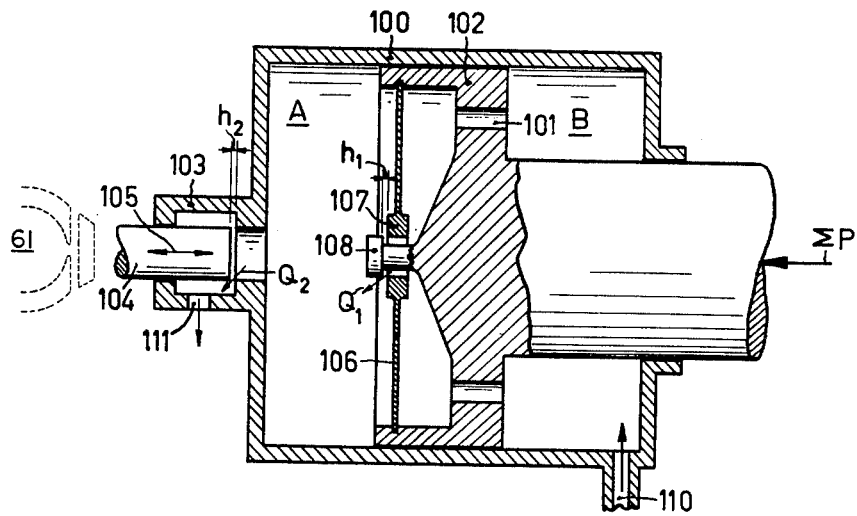

FIGS. 4 and 5 refer to the second main embodiment of the servo-mechanism according to the invention, in which not all flow apertures of the same compartment are simultaneously controlled by a pressure responding member. The mechanism shown in FIG. 4 is provided with a separate compensation slide. FIG. 5 shows a further detailed servo-mechanism with one-side control, in which a pressure-responding member is fastened to the piston.

In the arrangement of a known hydraulic servo-mechanism shown diagrammatically in FIG. 1 provision is made of a working cylinder 1 with a piston 2 and a piston rod 3, adapted to move therein. The piston 2 divides the working cylinder into compartments A and B. Each compartment communicates with an inlet and an outlet for a hydraulic fluid, hereinafter termed oil for the sake of simplicity. The supply of oil from the container 10 is provided by means of an oil pump 11 via the duct 12, which bifurcates into two supply ducts 13 and 14. The outlet of oil takes place via the ducts 16 and 15, which converge in a common duct 17, opening out in the container 10. The arrangement of the oil circuit is such that in the duct portion 12 prevails a substantially constant oil pressure and in the duct 17 approximately atmospheric pressure. Between the ducts 12 and 17 provision is made of a valve 18, by means of which the oil pressure in the duct 12 is kept constant within very narrow limits. In each of the supply ducts 13 and 14 and of the outlet ducts 15 and 16 provision is made of a flow aperture, the size of which can be regulated by means of a slide 21, adapted to move in a housing 20. The position of the slide with respect to the housing 20 is controlled by an external control-member. When the servo-mechanism shown in FIG. 1 is employed for the automatic conrtol of a machine tool, the piston rod 3 is connected with a sledge 23 of a chisel holder 26 and the position of the slide 21 is determined via an electrical converter 24 by an electrical control-signal 25. Tthrough the ducts 13, 14, 15 and 16 flow the quantities of oil $Q_1$, $Q_2$, $Q_3$ and $Q_4$ respectively. In the compartments A and B prevail the pressures $p_1$ and $p_2$ respectively. These pressures, multiplied by the surfaces $F_1$ and $F_2$ respectively on either side of the piston 2, establish an equilibrium with the axial total piston load $\Sigma P = p_1.F_1 - p_2.F_2$. This load is built up from different components, for example, the force exerted on the chisel 26, the friction, if any, and/or the inertia forces of the reciprocating parts. Starting from a given state of equilibrium in which the piston 2 stands still with respect to the cylinder 1, the displacement of this piston over a given distance can be performed by adjusting the slide 21 by means of the control-signal 25 so that the quantities of oil flowing through the compartments A and B are varied. The piston is then moved until the slide 21 returns into its initial position by means of a further command. Consequently, the displacement of the unloaded piston 2 and of the sledge 23 coupled herewith is performed not until the plunger is displaced by an external control.

When the total load $\Sigma P$ is varied, for example owing to an increase in the force of the chisel or to a variation in the frictional forces in the reversal of the piston movement, the pressure $p_1$ in one of the compartments, for example A, will increase, so that $Q_1$ decreases and $Q_3$ increases. In a similar manner, a lower pressure $p_2$ results in that $Q_2$ increases and $Q_4$ decreases. The piston 2 then moves to the left, viewed in FIG. 1. This situation in which the position of the piston is varied owing to a variation in the value of the total load $\Sigma P$ without an external control-signal 25 being supplied, is undesirable for control-technical reasons.

By means of the methods to be described hereinafter, such a compensation can be obtained in the event of a variation in the total load $\Sigma P$ that in spite of the pressure variation in one or in both compartments the piston invariably occupies the position determined by the external control-signal 25. To this end the servo-mechanism is provided with a member responding to the pressure in one or in both compartments A and B, which member changes the size of one or more flow apertures so that with a pressure variation in one or in both compartments the difference between the quantities of oil supplied and conducted away per unit time for the compartment concerned is substantially independent of the pressure prevailing in the compartment concerned. It will be seen hereinafter that the variation of one or more flow apertures is performed quite independently of the external regulation of the slide.

The first method will be explained with reference to two embodiments shown in FIGS. 2 and 3.

The mechanism shown in FIG. 2 comprises a working cylinder 30 and a piston 31, which divides this cylinder in the manner described above into compartments A and B. Provision is furthermore made of a control-valve having a housing 35 with a spool 36, adapted to move therein. The shapes of the inner side of the housing 35 and of the outer side of the spool 36 are such that two chambers 45 and 46 are provided in the control-valve, these chambers communicating directly through ducts 37 and 38 with the compartments A and B. There are furthermore four flow apertures $h_1$, $h_2$, $h_3$ and $h_4$, via which the chambers 45 and 46 communicate also with the common oil supply 39 and the oil outlets 40 and 41. The inlet 39 is connected with a constant pump pressure and at the area of the outlets 40 and 41 prevails approximately atmospheric pressure. The spool 36 which is made at least partly of magneto-strictive material, is capable of varying its length, when a surrounding control coil 50 is energized in a conventional manner. The function of this energization of the coil may be compared with the external control-signal 25 of FIG. 1. The side walls of the compartments A and B are furthermore provided with diaphragms 51 and 52, each of which responds to the pressure in the compartment concerned. The elastic deformations of these diaphragms are electrically coupled with a difference amplifier 27, which energizes a compensation coil 55, also surrounding the spool 36, in accordance with the measured elastic deformations of the diaphragms.

The compensation effect is obtained as follows: In the same manner as in FIG. 1 the pressure in the compartment A, for example, increases and that in the compartment B decreases due to a variation in the overall load $\Sigma P$. This is indicated in FIG. 2 by + and —. Thus $Q_1$ and $Q_4$ decrease and $Q_2$ and $Q_3$ increase, so that the piston 31 moves to the left. That is, if the piston 31 moves to the left as seen in FIG. 2 the flow in conduit 37 will be outwardly as indicated by the arrow. Without movement of the spool 36 of the flow $Q_2$ through $h_2$ will increase but due to the greater backpressure in chamber 45 the flow $Q_1$ through $h_1$ will decrease. Since the volume of chamber B increases and piston 31 moves to the left the flow $Q_3$ through $h_3$ will increase and $Q_4$ will decrease. The difference signal amplified by the difference amplifier 27 is converted by the compensation coil 55 into a current variation. As a consequence, the spool 36, which is fastened in the housing 35 on the left-hand side, is lengthened and the apparatus $h_2$ and $h_3$ become smaller and the apertures $h_1$ and $h_4$ become larger. With a suitable proportioning of the diaphragms 51 and 52 and a suitable amplification of the measured difference signal as a measure for the difference in elastic deformations of the diaphragms 51 and 52 the flows $Q_1$, $Q_2$, $Q_3$ and $Q_4$ can be kept constant by varying the size of the apertures $h_1$, $h_2$, $h_3$ and $h_4$, so that the effect of the overall piston load $\Sigma P$ can be opposed or compensated and the movement of piston 31 due to load variation is prevented within given limits. Thus, in accordance with the first method referred to above a simultaneous variation of all flow apertures is performed by means of a pressure-responsive member. In this embodiment provision is made of two diaphragms, but it is obvious that compensation may also be achieved by using only one diaphragm. However, with a view to symmetry and to any variations in the pump pressure it will be preferred to use two diaphragms.

FIG. 3 shows a mechanism similar to that of FIG. 2. However, the cylinder compartment B communicates with the full pump pressure $p_0$, which is preferably kept constant. A control-mechanism 61 controls the quantities of oil $Q_1$ and $Q_2$ supplied to and conducted away from the chamber 62, communicating with the compartment A. With this regulation, in which the flow apertures $h_1$ and $h_2$ are simultaneously controlled by means of the position of the slide rod 63, the external control-signal is formed by the current passing through the windings 64, surrounding a magnet 65. This magnet is adapted to cooperate in the manner illustrated in the figure with the armature 66, provided on the rod 63. The connection between the control-valve and the cylinder 67 is again formed by two ducts 68 and 69. The compensator comprises the cylinder compartment A communicating via the duct 71 with the chamber C in the housing 70 of the control-valve. The communication is established via the duct 71. The rod 63 is furthermore provided with a diaphragm 75. At its periphery this diaphragm closes the chamber C and is secured in the housing 70 in a manner not shown in detail.

Assuming an increase in pressure in the compartment A, for example due to a variation in the overall load $\Sigma P$, this variation will cause the fluid pressure to rise in the chamber 62 communicating through the duct 68 with the compartment A. This results in that the quantities of oil flowing through the flow apertures $h_1$ and $h_2$ are varied so that $Q_1$ decreases and $Q_2$ increases and the piston 81 moves to the left, if the flow apertures $h_1$ and $h_2$ were constant. Movement of piston 81 is prevented by compensating for the load change as follows: Owing to the presence of the compensating diaphragm 75 the pressure in the chamber C directly communicating with the compartment A will also increase. As a result the diaphragm 75 is elastically deformed and the rod portion 63 will be displaced to the right so that the flow aperture $h_2$ becomes smaller and $h_1$ becomes larger. Although on the one hand owing to the increased pressure in the chamber 62 the quantity of oil $Q_2$ tends to increase, the substantially simultaneous reduction of the flow aperture $h_2$ effects a decrease in $Q_2$. The result is, of course, dependent upon a correct proportioning of the diaphragm 75.

With the compensation regulations according to the first method described above all flow apertures of one or of both cylinder compartments are simultaneously regulated by a simultaneous control of the size of these apertures with the aid of one or more pressure-responding members.

In a second method in which also with pressure variation in one or in both cylinder compartments load compensation can be achieved a completely different principle is applied. This will now be described with reference to FIGS. 4 and 5.

The servo-mechanism shown in FIG. 4 comprises a working cylinder 85 with a piston 86, adapted to move with respect thereto and a regulator comprising a housing 87 in which a slide 88 is adapted to move. The housing 87 has an aperture 89, which communicates in a manner not shown with a supply duct for oil with constant pump pressure. Provision is furthermore made of a compensator 91. The latter comprises a housing 92 with an aperture 93, where the oil pressure approaches the atmospheric pressure. In the housing 92 is a slide 94 is arranged so as to be slidable. This slide is fastened at both ends to diaphragms 95 and 96. The diaphragms are stretched at their peripheries in the housing 92. The housings 87 and 92 communicate in the manner shown with the cylinder compartments A and B. The oil supply to the compartment A takes place through a flow aperture $h_1$ and the oil is conducted away through the flow aperture $h_2$. The quantities of oil supplied and conducted away per unit time are designated by $Q_1$ and $Q_2$. Similarly with the compartment B the inlet and outlet of the oil are designated by $Q_3$ and $Q_4$.

The system operates as follows:

On the basis of a given state in which the quantities of oil passing per unit time through the compartments A and B are determined by the position of the regulator or externally governed slide 88. A variation in the overall load $\Sigma P$ will cause, for example, the pressure $p_1$ to increase and the pressure $p_2$ to decrease. If the diaphragms 95 and 96 were rigid, $Q_1$ and $Q_4$ per unit time would decrease and $Q_2$ and $Q_3$ would increase, which would result in a left-hand movement of the piston 86. However, since the diaphragms 95 and 96 are elastically deformable diaphragms, they will be bent by the higher pressure prevailing in the space 97 and by the lower pressure prevailing in the space 98 so that the slide moves to the left, so that the flow aperture $h_2$ is reduced and $h_4$ is enlarged. Although an increase in $P_1$ tends to increase flow $Q_2$ to the reservoir and decrease flow $Q_4$ to the reservoir because the piston 86 tends to move to the left, by increasing the size of aperture $h_4$ and decreasing the size of aperture $h_2$ the piston 86 will be held against movement due to an increased pressure in A by controlling the flow to the reservoir exclusively. The exhaust flow, or flow to the reservoir, is varied and thus the movement of piston 86 is counteracted by the curvatures of the diaphragms 95 and 96. By a correct proportioning of the diaphragms the counteraction thereof may be such that with pressure variations in the compartments A and B the differences $Q_1-Q_2$ and $Q_3-Q_4$ are kept constant. Consequently, despite a variation in $\Sigma P$, the piston 86 will maintain the position determined by the slide 88. As a matter of fact only one of the diaphragms 95 or 96 may be used, but similarly to the servo-mechanism shown in FIG. 2 it is more logical to use two diaphragms. In the arrangement of FIG. 4 only one flow aperture of one cylinder compartment of the last-mentioned embodiment is acted upon completely independently of the external control-signal of the slide 88. It has been found that the compensation by this arrangement provides the possibility of compensating not only the load disturbances for the servo-mechanisms which are normally in a state of equilibrium, but to a given extent also the load disturbances with the mechanisms being in a so-called quasi-static condition, in which the piston speed, the overall piston load and the control-signal for the slide 88 are constant.

The servo-mechanism shown in FIG. 5 also comprises a working cylinder 100, in which a piston 102 is adapted to move, which is provided with spaced supply openings 101. The cylinder 100 is rigidly connected with a control valve having a housing 103, in which a control slide 104 is adapted to move in the directions of the arrow 105. The part of the piston 102 facing the compartment A is provided with a compensator including a diaphragm 106. The diaphragm 106, the periphery of which is held in the piston 102, has a central flow aperture 107 and the piston 102 is provdied with a shoulder 108. Between the diaphragm 106 and the shoulder 108 provision is made of the flow aperture $h_1$.

On the basis of a state of equilibrium of the piston 102, a supply of oil in the direction of the arrow 110 with constant pressure will pass a quantity of oil through the apertures 101 to the left-hand side of the piston 102 so that a quantity $Q_1$ is obtained at the flow aperture $h_1$. Through the flow aperture $h_2$ at the area of the control-slide 104, the quantity of oil $Q_1$ is conducted away via the aperture 111, where approximately the atmosphere pressure prevails. The quantity of oil conducted away through the aperture $h_2$ is designated in the figure by $Q_2$. In the state of equilibrium of the piston 102, $Q_1$ and $Q_2$ are equal. Upon a variation in the overall load $\Sigma P$ on the piston, the pressure in chamber A, for example, increases in the manner described above. If the diaphragm 106 is considered to be rigid, this increase in pressure would result in that $Q_2$ would increase and $Q_1$ would decrease, as a result of which the piston 102 would move to the left. Since the diaphragm 106 is elastic, it will be elastically deformed with an increase in pressure in the compartment so that the flow aperture $h_1$ is enlarged, which results in that $Q_1$ increases. By a correct proportioning of the diaphragm 106 the quantity of oil $Q_1$ passing through the flow aperture $h_1$ will increase to the same extent as $Q_2$ in the case of an increase in pressure in the compartment A, so that the difference between $Q_1$ and $Q_2$ remains constant and the piston 102 invariably occupies the position determined by the control-slide 104. Also in this embodiment only one of the flow apertures of a compartment is controlled by a diaphragm. With load compensation for a servo-mechanism in this embodiment with so-called one-side control use is made of a pressure-responding member for the compensation control of the supplied quantity of oil $Q_1$.

It will be obvious that a compensation may also be obtained by acting upon the flow aperture $h_2$ by means of the pressure, irrespective of the displacement of the slide 104.

In the foregoing, reference is invariably made to a piston movement with respect to the working cylinder. It will be obvious that the load compensation described may be achieved both with a servo-mechanism in which the piston moves in a stationary cylinder and in a mechanism in which the cylinder moves with respect to a stationary piston.

In the embodiment shown the pressure-responding member is always formed by a diaphragm. Although structures with helical springs and the like are possible, use is preferably made of diaphragms, since they have the advantage that in conjunction with a slide rod connected herewith the slide need not be additionally centered. Particularly the structure of the compensation slide 94 of FIG. 4 needs no further centering at all, since its position is sufficiently determined by the fastening to the diaphragms 95 and 96. This has the advantage that friction may be neglected.

The compensation systems described above relate, it is true, to linear servo-mechanisms, but it will be obvious that they may also be used in rotary servo-mechanisms.

What is claimed is:

1. A hydraulic servo-mechanism comprising a working cylinder, a piston movable within said cylinder and dividing said cylinder into a first and a second compartment, a continuous pressure liquid supply system for moving and positioning said piston within said cylinder, said system including a first adjustable valve port means for controlling a continuous flow of liquid into at least one said compartment and a second adjustable valve port means for controlling a continuous flow of liquid out of said one said compartment, means for adjusting at least one of said first and second valve ports for establishing a flow condition within said one said compartment for positioning said piston within said cylinder, and means responsive to pressure within said one said compartment coupled with at least one of said first and second adjustable valve ports for adjusting the said coupled valve port for maintaining the said established flow condition and position of said piston compensated for external load conditions acting on said piston.

2. A hydraulic servo-mechanism according to claim 1 wherein said control valve means comprises a valve housing having a plurality of spaced inlet and outlet ports and a valve spool movable within said valve housing, control means connected at one end of said spool for moving said spool to position said piston within said cylinder and said pressure responsive means connected with the other end of said spool for moving said spool to maintain said piston in said position by compensating for load variations acting on said piston.

3. A hydraulic servo-mechanism comprising a working cylinder having a piston movable within said cylinder and dividing said cylinder into first and second compartments, a pressure liquid supply system including a control valve regulating the liquid flow to and from said working cylinder for moving said piston, control means connected with said control valve for operating said control valve, and pressure responsive means operatively connected with at least one of said compartments and said control valve for compensating for load variations acting on said piston by operating said control valve independently of said control means.

4. A hydraulic servo-mechanism according to claim 3 wherein said control valve comprises a valve housing having a plurality of spaced inlet and outlet ports and a valve spool of magneto-strictive material, means fixing one end of said spool in said housing, said control means including a control coil surrounding a portion of said spool, and a compensating coil surrounding a second portion of said spool, and means connected with said pressure responsive means for energizing said compensating coil.

5. A hydraulic servo-mechanism according to claim 3 wherein said control valve comprises a valve housing having a plurality of spaced inlet and outlet ports and a valve spool slideably movable within said housing, said control means comprising an armature secured to one end of said spool and electro-magnetic signal means coupled with said armature, said pressure responsive means comprising an elastically deformable element secured to the other end of said spool, and means connecting said elastically deformable element with one of said compartments.

6. A hydraulic servo-mechanism comprising a working cylinder having a piston movable within said cylinder and dividing said cylinder into first and second compartments, a pressure liquid supply system including a control valve regulating the liquid flow to and from said working cylinder for moving said piston, control means connected with said control valve for operating said control valve, a compensating valve for also varying the liquid flow to and from said cylinder, and pressure responsive means operatively connected with at least one of said compartments and said compensating valve, said pressure responsive means and said compensating valve varying the flow of liquid to said cylinder in response to load variations acting on said piston.

7. A hydraulic servo-mechanism comprising a working cylinder having a piston movable within said cylinder and dividing said cylinder into first and second compartments, a pressure liquid supply system including a control valve and a compensating valve regulating the liquid flow to and from said working cylinder, control means connected with said control valve for operating said control valve, pressure responsive means connected with at least one of said compartments and said compensating valve, for operating said compensating valve, said control valve regulating movement of said piston and said compensating valve regulating the pressure within said one compartment for offsetting load variations acting on said piston and thereby preventing movement of said piston independently of said control valve.

8. A servo-mechanism according to claim 7 wherein said control valve regulates the flow of liquid to said cylinder and said compensating valve regulates the flow of liquid from said cylinder.

9. A hydraulic servo-mechanism according to claim 8 wherein said control valve comprises a control valve housing having an outlet opening communicating with one of said compartments, an outlet opening communicating with the other of said compartments and an inlet opening communicating with a source of pressure fluid, a slideably movable spool within said valve housing, and control means for moving said spool; said compensating valve comprises a valve housing having an inlet opening communicating with one of said compartments, an inlet opening communicating with the other of said compartments and an outlet opening communicating with atmosphere, a slideably movable spool valve member within said last named valve housing and elastic pressure responsive diaphragm means at each end of said last named spool valve member for slideably moving the same, one said diaphragm being exposed to the liquid pressure of one compartment and the other of said diaphragms being exposed to the liquid pressure of the other compartment.

10. A hydraulic servo-mechanism comprising a working cylinder having a piston slideably movable therein and dividing said cylinder into first and second compartments, a pressure liquid supply system conmmunicating with each said compartment and including a control valve means regulating the liquid flow from said working cylinder for moving said piston, and pressure responsive means for compensating for load variations acting on said piston; said pressure responsive means comprising said piston, a recess in said piston adjacent one of said compartments, at least one duct in said piston communicating said recess and the other of said compartments, an elastic diaphragm secured to said piston at its periphery and overlying said recess, said diaphragm defining a variable aperture between said piston recess and said one compartment for providing a variable liquid flow passage between said compartments.

11. A hydraulic servo-mechanism according to claim 10 wherein said control valve means is operatively connected with said one compartment and pressure liquid is supplied to the other compartment.

12. A hydraulic servo-mechanism comprising a working cylinder having a piston slideably movable within said cylinder and dividing said cylinder into a first and second compartment, a pressure liquid supply system communicating pressure liquid to one of said compartments and withdrawing liquid from said cylinder via the other of said compartments, said piston having a plurality of ducts therethrough and a chamber formed in one face thereof communicating via said ducts with said one compartment, a diaphragm secured on said piston overlying said chamber and having a central aperture, a projection connected with said piston extending through said diaphragm aperture for varying liquid flow therethrough and having a shoulder closing said aperture, control valve means in said pressure liquid supply system operatively connected with the other of said compartments, and means for operating said control valve for moving said piston.

13. A hydraulic servo-mechanism comprising a working cylinder, a piston moveable within said cylinder, a pressure liquid supply system including a first moveable control valve means for varying the flow condition within said cylinder and moving said piston within said cylinder, second valve means responsive to pressure in said cylinder for establishing a flow condition of liquid within said cylinder for maintaining said piston in a determined position therein, and for compensating for external load conditions acting on said piston which would normally cause said piston to move from said determined position; said second valve means responding to pressure variations within said cylinder for maintaining said established flow conditions compensated for said external load condition whereby said piston remains substantially in said determined position.

14. A hydraulic servo-mechanism comprising a working cylinder, a piston moveable within said cylinder, a pressure liquid supply system including a first moveable control valve means for varying the flow condition within said cylinder and moving said piston within said cylinder and a second valve means responsive to pressure in said cylinder for establishing a flow condition of liquid within said cylinder for maintaining said piston in a determined position therein, and for compensating for external load conditions acting on said piston which would normally cause said piston to move from said determined position; said second valve means responding to movement of said piston from said determined position for maintaining said established flow conditions compensated for said external load condition whereby said piston remain substantially in said determined position.

References Cited by the Examiner

UNITED STATES PATENTS

| | | | |
|---|---|---|---|
| 2,376,519 | 5/45 | Stacy. | |
| 2,381,923 | 8/45 | Obtresal. | |
| 2,382,866 | 8/45 | Edge et al. | 91—49 XR |
| 2,384,774 | 10/45 | Smallpiece. | |
| 2,642,846 | 6/53 | Morgen | 91—49 |
| 2,750,743 | 6/56 | Korkowski et al. | |
| 2,767,369 | 10/56 | Schindler. | |
| 2,770,222 | 11/56 | Anderson. | |
| 2,877,743 | 3/59 | Liaaen. | |
| 2,884,905 | 5/59 | Jensen | 91—49 |
| 2,902,007 | 9/59 | Rockwell | 91—442 XR |
| 2,994,345 | 8/61 | Strader | 91—433 XR |
| 2,995,116 | 8/61 | Dobbins | 91—51 |

FOREIGN PATENTS

| | | |
|---|---|---|
| 992,359 | 10/51 | France. |
| 694,455 | 8/40 | Germany. |

FRED E. ENGELTHALER, *Primary Examiner.*

RICHARD B. WILKINSON, SAMUEL LEVINE,
*Examiners.*